United States Patent
Campbell

(10) Patent No.: US 8,065,602 B2
(45) Date of Patent: Nov. 22, 2011

(54) METHODS OF COMPLETING ELECTRONIC FORMS RELATING TO INTERACTIONS WITH CUSTOMERS BY CARRYING OVER CALL BACK NUMBERS BETWEEN FORMS

(75) Inventor: Michelle Campbell, North Augusta, SC (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1091 days.

(21) Appl. No.: 11/860,532

(22) Filed: Sep. 24, 2007

(65) Prior Publication Data

US 2009/0083618 A1   Mar. 26, 2009

(51) Int. Cl.
*G06N 3/00* (2006.01)
(52) U.S. Cl. ...................................................... 715/224
(58) Field of Classification Search .................. 715/221, 715/224, 226
See application file for complete search history.

(56) References Cited

U.S. PATENT DOCUMENTS

| | | | | |
|---|---|---|---|---|
| 6,421,693 B1* | 7/2002 | Nishiyama et al. | ........... | 715/226 |
| 7,386,586 B1* | 6/2008 | Headley et al. | ............... | 709/202 |
| 7,660,779 B2* | 2/2010 | Goodman et al. | ............... | 706/48 |
| 2003/0028792 A1* | 2/2003 | Plow et al. | ..................... | 713/193 |
| 2004/0205530 A1* | 10/2004 | Borg | ............................. | 715/507 |
| 2005/0055438 A1* | 3/2005 | Matti | ............................. | 709/224 |
| 2005/0138539 A1* | 6/2005 | Bravery et al. | ................ | 715/507 |
| 2005/0149854 A1* | 7/2005 | Pennell et al. | ................. | 715/507 |
| 2006/0004675 A1* | 1/2006 | Bennett et al. | ................. | 705/402 |
| 2007/0113168 A1* | 5/2007 | de Souza et al. | ............... | 715/507 |
| 2007/0198368 A1* | 8/2007 | Kannan et al. | ................... | 705/26 |
| 2008/0172598 A1* | 7/2008 | Jacobsen et al. | ............... | 715/224 |
| 2009/0024533 A1* | 1/2009 | Fernandes et al. | ............... | 705/75 |

\* cited by examiner

*Primary Examiner* — Kyle Stork
(74) *Attorney, Agent, or Firm* — Parks IP Law LLC; Jennifer P. Medlin, Esq.

(57) ABSTRACT

Interactions between customers and representatives of a service provider are documented by providing multiple electronic forms for completion. Information that is requested for both forms is carried over from one form to the next rather than requiring the representative to manually enter the same information multiple times. For instance, a call back number of the customer may be entered on one electronic form being used to edit information for a customer and that call back number is automatically carried over to another form being used to document a commitment to handle a request from the customer. The representative is relieved of double-entry, and mistakes that might arise from double-entry are reduced or eliminated. The electronic forms may be submitted to a tracker database that allows for further disposition of the request by the customer.

17 Claims, 4 Drawing Sheets

400

| Forms | CBP |

Sales Report   Billing Request   Other Request   Escalations   Collections   Status   Need Help General Commitment Folder Edit   Customer Telephone  [7069879877] —402

First Name  [Testing First Name] —404

Last Name  [Testing Last Name] —406

Request Information  [           ] —410

Customer's CBP  [8889879877] —408

Due Date of Requested  [    ] —412

Advise Customer  ☐ A specialist may call them back to get everything corrected

Call back intervall   Today if before noon :: tomorrow if after noon

[SUBMIT] —414

| Forms | CBP |

Sales Report   Billing Request   Other Request   Escalations   Collections   Status   Need Help -Add/Edit Customer Primary Telephone  [706-987-9877] —502

First Name  [Testing First Name] —504

Last Name  [Testing Last Name] —506

Customer's CBP  [888-987-9877] —508

METHODS OF COMPLETING ELECTRONIC FORMS RELATING TO INTERACTIONS WITH CUSTOMERS BY CARRYING OVER CALL BACK NUMBERS BETWEEN FORMS

TECHNICAL FIELD

Embodiments relate to completing electronic forms to document interactions with customers. More particularly, embodiments relate to completing the electronic forms by carrying over call back numbers between multiple forms being completed for a given customer interaction.

BACKGROUND

Departments of service providers take calls from customers for many reasons. Customers may contact a customer service or sales department to place a new order for a service, to request assistance with an existing service, to request maintenance or repair for a service, or to cancel the service. In doing so, a customer service or sales representative must document the telephone call or other interaction that has occurred with the customer.

In some cases, the customer service or sales representative is incapable of handling the particular request that the customer is making. In those cases, the representative of the service provider must use electronic forms to document the request that is then electronically submitted to other departments that are better suited to handle the request.

In cases such as these where electronic forms are utilized to document the interaction with the customer, information is obtained from the customer and the representative manually enters this information into the electronic forms. There may be instances where multiple electronic forms must be completed, such as where one form is dependent upon another form or where one form is used for editing information such as contact information while the other form is used to document the interaction itself and borrows the contact information from the form used for editing.

In such cases, information that is required for completion of one form may also be required for completion of another form relating to the same customer. However, the representative may be required to manually enter the information in one form, and then proceed to the next form where the same information must be manually entered again. While such double-entry of information is time consuming and inefficient, it is also prone to errors where the representative makes a mistake when entering the same information multiple times for multiple forms. The call back number of the customer is one such type of information that must often be entered on multiple forms. The call back number of the customer is particularly burdensome in that it is information that must be requested by the representative, that may change from one interaction with the customer to the next, and that is crucial to effectively handle the request made by the customer.

SUMMARY

Embodiments address issues such as these and others by providing for the carry over of information between fields of one form being completed for a customer interaction to another form being completed for the customer interaction. In particular, the call back number that has been obtained from the customer and that is manually entered in one form is carried over to another form without requiring a representative or the customer to provide the information to the other form.

Embodiments provide a computer readable medium containing instructions that perform acts that include, in relation to a particular service account of a customer, displaying a first form containing fields for a name of a customer, an identification number of the service account, and a call back telephone number of the customer and containing a submission button that remains inactive until the fields for the name, the identification number, and the call back telephone number are completed. The acts further include receiving data into the field for the identification number of the service account and subsequently displaying a second form containing fields for at least the customer name and the call back telephone number. Upon receiving data into the fields of the second form for the customer name and the call back telephone number, then the acts further include re-displaying the first form including the name and call back number received within the second form and activating the submission button of the first form.

Embodiments provide a computer readable medium containing instructions that perform acts that include receiving a selection from a user to open a first form regarding handling an incoming request from a customer relating to a service account for the customer. The acts further include, in response to the request, displaying the first form including fields for receiving user input to specify an identification of the service account, a name of the customer, and a call back number of the customer and further including an inactive submission button. Additionally, the acts include receiving user input to specify the identification of the service account and looking up the identification in a data store to obtain the name of the customer. If the name of the customer is found, then the acts include auto-filling the name of the customer into the first form, waiting for user input to specify the call back number, and activating a submission button of the first form upon receiving the call back number. If the name of the customer is not found, then the acts include displaying a second form that includes fields for receiving the name of the user and the call back number for the user, waiting for user input to specify the customer name and the call back number, and re-displaying the first form by including the customer name and call back number received within the second form and by activating the submission button of the first form.

Embodiments provide a computer-implemented method of collecting information needed to handle an incoming request from a customer regarding a service account. The method involves, in relation to a particular service account of a customer, displaying a first form containing fields for a name of a customer, an identification number of the service account, and a call back telephone number of the customer and containing a submission button that remains inactive until the fields for the name, the identification number, and the call back telephone number are completed. The method further involves receiving data into the field for the identification number of the service account and subsequently displaying a second form containing fields for at least the customer name and the call back telephone number. Upon receiving data into the fields of the second form for the customer name and the call back telephone number, then the method involves re-displaying the first form including the name and call back number received within the second form and activating the submission button of the first form.

Other systems, methods, and/or computer program products according to embodiments will be or become apparent to one with skill in the art upon review of the following drawings and detailed description. It is intended that all such additional systems, methods, and/or computer program products be

DESCRIPTION OF THE DRAWINGS

FIG. 4 shows an example of one electronic form for receiving information relating to a customer interaction according to various embodiments.

FIG. 5 shows an example of another electronic form for receiving information relating to the customer interaction where information is carried over to this form according to various embodiments.

DETAILED DESCRIPTION

Embodiments provide for the completion of electronic forms relating to interactions with customers by receiving information including a call back number of a customer into one form and then carrying over that information into another form. Therefore, a representative of the service provider only has to enter the information such as the call back number a single time for a given transaction and the efficiency is increased while the chances of error are decreased, according to exemplary embodiments.

Figure 1:
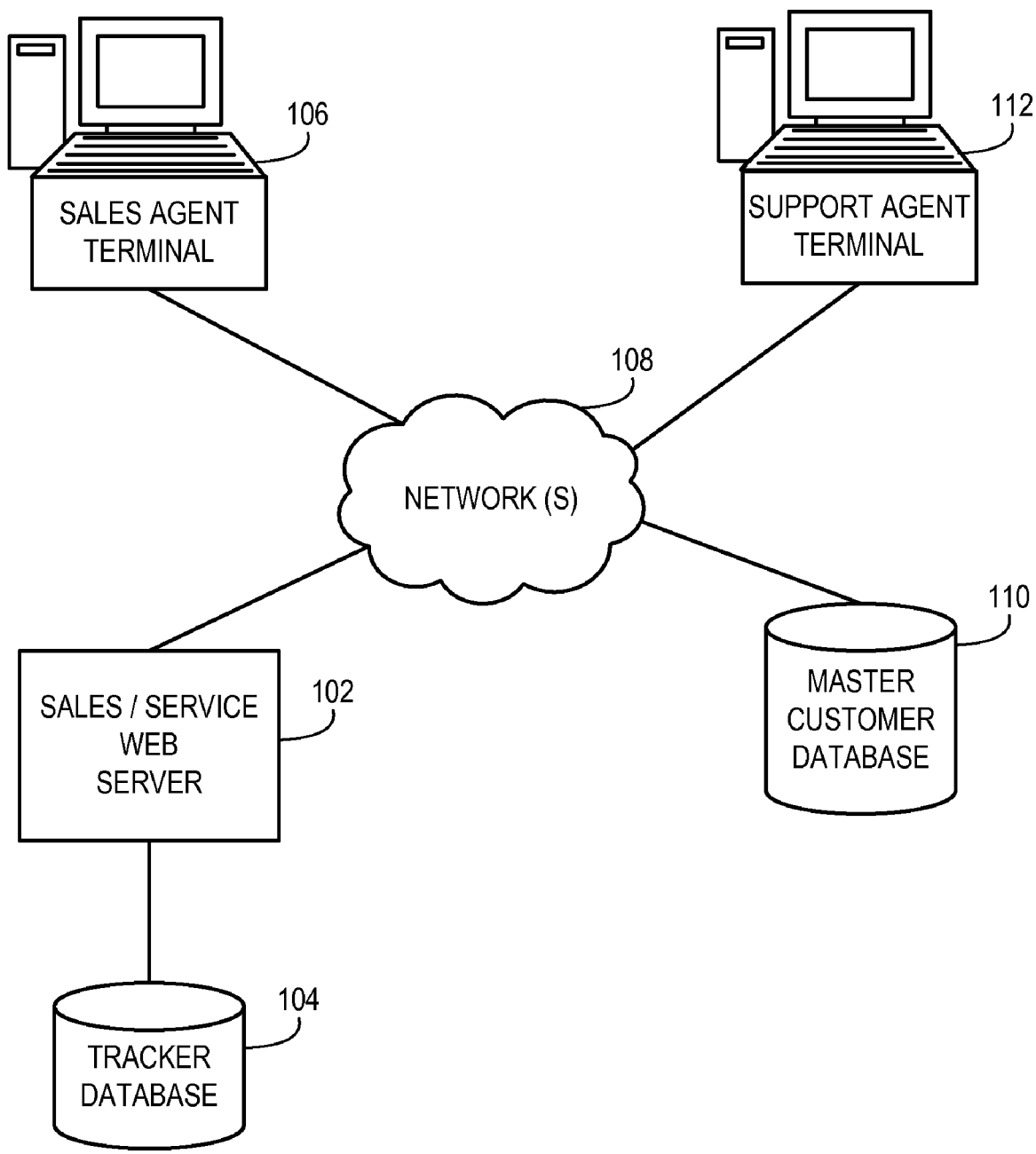
FIG. 1 shows an example of an operating environment for various embodiments to handle the completion of electronic forms relating to customer interactions.

FIG. 1 shows one example of an operating environment. Here a sales and service web server 102 is present to provide the electronic forms as web pages that can be completed and submitted by the representatives of the service provider. While the embodiments are described with respect to electronic forms offered as web pages from the web server 102, it will be appreciated that electronic forms may alternatively be non-web based and may be accessed from other server types such as standard file servers. Furthermore, as discussed below, it will be appreciated that the electronic forms may originate from a user terminal that then submits those electronic forms to a tracker database 104 or maintains them internally.

The web server 102 of this example is in communication with the tracker database 104 that keeps track of the electronic forms that document the interactions with customers. The tracker database 104 may be internal to the web server 102 or may be remotely located and accessed through an external data connection such as a network connection. The tracker database 104 may maintain the electronic documents for purposes of them being delivered to or accessed by other support personnel of the service provider. These personnel may utilize the information to address the request of the customer, including contacting the customer at the call back number that has been recorded within the electronic form when appropriate.

The web server 102 may communicate with other computer systems and databases via one or more data networks 108. The web server 102 may communicate with a user terminal 106 of the representative such as a sales agent to provide the electronic forms to be filled in by the representative during the interaction with the customer.

The web server 102 may communicate with a master customer database 110 to find stored information about a customer account. For example, an account number may be manually entered into an electronic form and the web server 102 may then perform a look-up of the account number within the master customer database 110 to find additional information that may be automatically entered into the electronic form.

The web server 102 may also communicate with user terminals 112 of others such as support personnel of the service provider who may rely on the information of the electronic forms when handling the request made by the customer during the interaction between the customer and the sales agent. The support person may be notified by the web server 102 of an existing electronic form that has been completed by a sales agent via the user terminal 106, submitted into the tracker database 104, and that requires attention by the support person.

The user terminals 106, 112 may be personal computers, thin clients, and the like. The user terminals 106, 112 may access the electronic forms via a web browser that loads a web page provided by the web server 102. As an alternative, the user terminals 106, 112 may access the electronic forms by downloading the forms in a format other than a web page. As yet another alternative, the user terminals 106, 112 may provide views of the electronic forms that are being opened by the server 102 such as through terminal services or similar terminal display techniques.

Figure 2A:
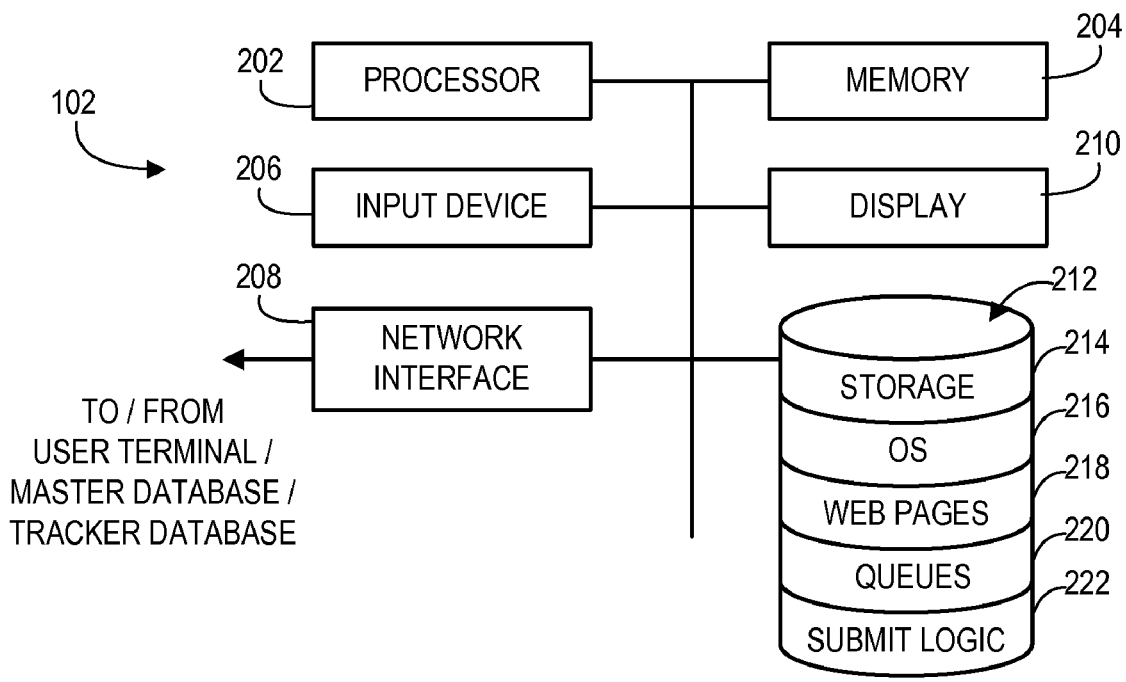
FIG. 2A shows an example of an electronic forms web server according to various embodiments.

FIG. 2A shows an example of the web server 102 that may provide the electronic forms as web pages, as non-web based documents, or as terminal displays. The web server 102 may be a computer system that includes a processor 202 that performs various logical operations to facilitate the completion of the electronic forms. The processor 202 may be of various forms including a general purpose programmable processor, an application specific processor, hardwired digital logic, and combinations thereof. The processor 202 may communicate with various other components such as a memory 204.

The memory 204 may store programming as well as other data that may be utilized by the processor 202 when performing the various logical operations. The processor 202 and memory 204 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The processor 202 may also communicate with other components including input devices 206 such as a keyboard and a mouse as well as output devices such as a display system 210. The processor 202 may utilize a storage device 212 that may provide non-volatile storage space 214 as well as storage of an operating system 216, web pages 218 or other file types that provide the electronic forms, queues 220 for staging information during completion of the electronic forms, and programming that provides logic 222 for submitting the electronic forms to the tracker database 104.

Figure 2B:
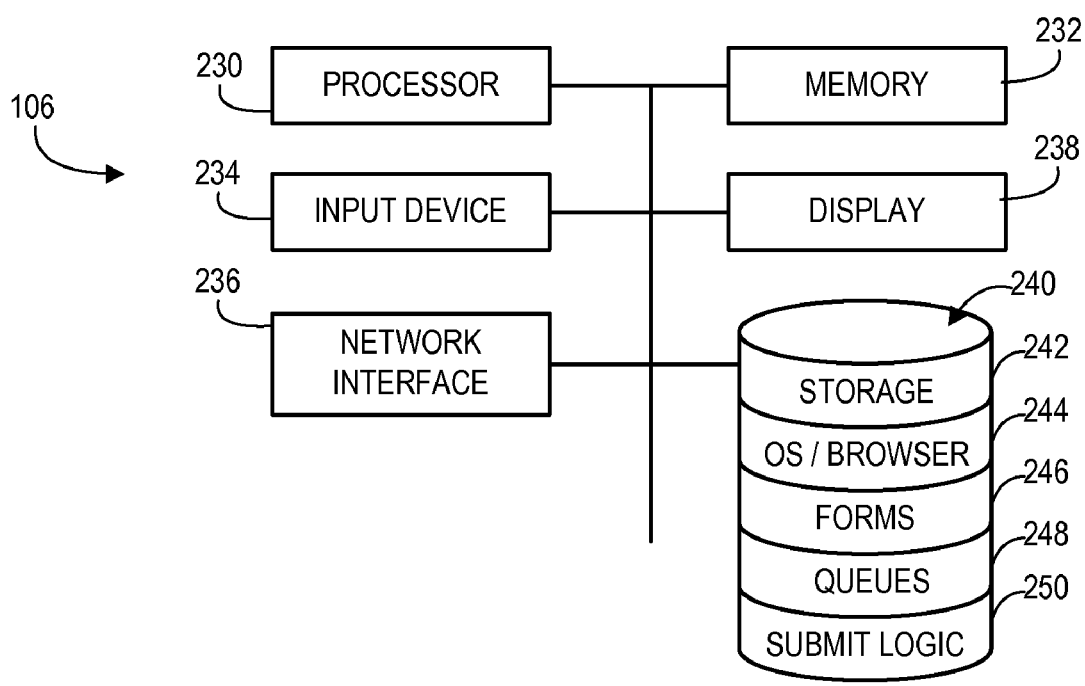
FIG. 2B shows an example of a user terminal for completing electronic forms according to various embodiments.

FIG. 2B shows an example of the user terminal 106 that a representative may utilize when completing electronic forms during interactions with customers. The user terminal 106 may be a mere terminal display device that receives displays from the web server 102 and sends input signals back to the web server 102 in the conventional terminal sense. Alternatively, the user terminal 106 may be a computer system that also includes a processor 230 that performs various logical operations to facilitate the completion of the electronic forms by displaying the electronic forms, receiving user input to compete the electronic forms, and sends the collected data to the server 102. The processor 230 may also be of various forms including a general purpose programmable processor, an application specific processor, hardwired digital logic, and combinations thereof. The processor 230 may also communicate with various other components such as a memory 232.

The memory 232 may store programming as well as other data that may be utilized by the processor 230 when performing the various logical operations. The processor 230 and memory 232 are also examples of computer readable media which store instructions that when performed implement various logical operations.

The processor 230 may also communicate with other components including input devices 234 such as a keyboard and a mouse as well as output devices such as a display system 238. The processor 230 may utilize a storage device 240 that may provide non-volatile storage space 242 as well as storage of an operating system 244. The storage device 240 may also store forms 246 such as where the user terminal 106 provides those forms without requesting them from a server or where the user terminal 106 stores completed forms prior to submitting them to the server 102. The storage device 240 may also provide a queue 248 for staging data during the completion of the electronic forms 246. Furthermore, for embodiments where the user terminal 106 acts independently of the server 102, the storage device 240 may store logic 250 for submitting the electronic forms 246 either to the server 102 for further handling and/or directly to the tracker database 104.

Figure 3:
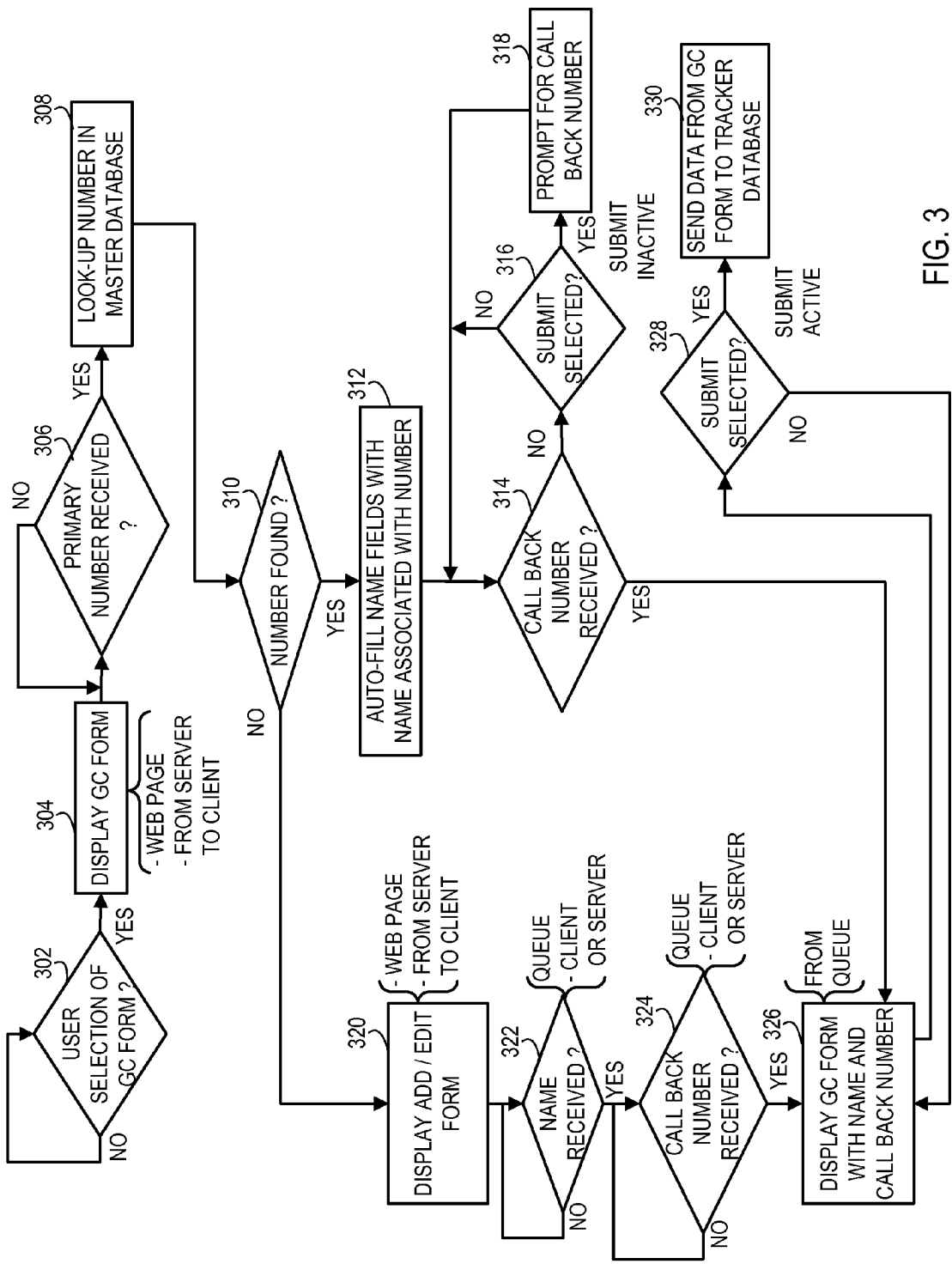
FIG. 3 shows an example of a set of logical operations performed to complete electronic forms according to various embodiments.

FIG. 3 shows a set of logical operations that may be performed by the server 102 in conjunction with the user terminal 106 according to various embodiments, or according to other embodiments, by the user terminal 106 independently of the server 102. The discussion will proceed with reference to the server 102 acting in conjunction with the user terminal 106. However, it will be appreciated that operations of the server 102 discussed in relation to FIG. 3 may alternatively be implemented by the user terminal 106 acting independently of the server 102.

The logical operations begin at a query operation 302 where the processor 202 detects whether a user has selected to open a first form, referred to herein as a general commitment (GC) form for this example. The GC form in this example provides a representative with various fields to manually complete or to allow some of the information to be automatically completed if such information is available from the master customer database 110. The representative may select to open the GC form upon an interaction with a customer occurring, such as due to an inbound or outbound telephone call, inbound or outbound electronic mail, chat session, and the like.

Upon the processor 202 detecting that the representative has selected to open the GC form, the processor 202 then displays the GC form for the user terminal 106 at a display operation 304. As discussed above, this display may be a web page displayed within a browser of the user terminal 106, may be a form used by a specific application for displaying such forms rather than a general web browser, or may even be displayed at the server 102 and then provided as a display to the user terminal through a terminal services approach.

An example of the GC form is shown as GC form 400 in FIG. 4. This GC form 400 includes various fields such as a customer telephone number in a field 402 where this number serves as the customer account number for the customer account to which the interaction pertains. The GC form 400 also includes a first name field 404, a last name field 406, a call back number field 408, a due date field 412, and a field 410 where details of the request can be specified. The GC form 400 also includes a submit button 414 which allows the GC form to be submitted to the tracker database 104 for further disposition. In this example, the submit button 414 is inactive until the various fields are completed by the representative. While FIG. 4 shows information already present in the various fields 402, 404, 406, 408, it will be appreciated that at the initial display of the GC form 400, the fields are blank and are awaiting manual input from the representative.

At a query operation 306, the processor 202 detects whether the primary number has been entered by the representative into the customer number field 402. The representative may ask the customer for an account number that the customer is concerned about or the representative may obtain a customer account number from a separate system that assigns customer account numbers for new accounts. The user terminal 106, upon receiving the information may upload it to the server 102 as an automatic function of the GC form 400. As an alternative, where the user terminal 106 includes the capability to query external resources for additional customer information or where the user terminal 106 stores additional customer information locally, the user terminal 106 may perform the detection of the query operation 306 for the purposes of doing a look-up of the additional customer information.

Upon the processor 202 detecting that the primary customer number has been entered into the customer number field 402, the processor 202 then performs a look-up of the primary customer number in the master customer database 110 at a look-up operation 308. The processor 202 performs this look-up to find information that it may use to auto-fill one or more of the fields of the GC form 400. At a query operation 310, the processor 202 detects whether the primary customer number has been found in the master customer database 110. If so, then the processor 202 obtains the first and last name of the customer from the master customer database 110, sends the first name of the customer to the first name field 404, and sends the last name of the customer to the last name field 406. For example, the electronic forms may be provided as active server pages whereby the web page server 102 may dynamically send and receive information from the web pages being displayed on the user terminal 106.

After having auto-filled the first and last name fields 404, 406 at a fill operation 312, the processor 202 may then detect whether the call back number has been manually entered into the call back number field 408 at a query operation 314. In this example, the call back number is required to be entered before the submission button 414 can become active since it is desired that the call back number be received from the customer and included in the GC form 400. If the call back number has been received, then the processor 202 displays the GC form 400 with the name and call back number shown in appropriate fields, such as the fields 404, 406, 408, at display operation 326. In this example, the call back number is not auto-filled by looking up the call back number from the master customer database 110 because the call back number is likely to change from one interaction with the customer to the next such that the number is requested each time there is an interaction with this customer.

At this point, the submit button 414 may be made active by the processor 202 since all necessary information is included in the GC form 400. Thus, the processor 202 detects whether the submit button 414 has been selected at a query operation 328. If so, then the processor 202 sends the data from the fields, such as the fields 402, 404, 406, 408, of the GC form 400 to the tracker database 104 for further disposition at a database operation 330. At this point, the operational flow terminates for this call and begins again at the query operation 302 for the next call.

Back at the query operation 314, if the processor 202 detects that the call back number has not been entered, the processor 202 does not yet activate the submit button 414 but detects whether the submit button 414 has been selected at a query operation 316. Upon detecting that the submit button 414 has been selected, then the processor 202 prompts the representative to enter the call back number at prompt operation 318, such as by providing a pop-up message and/or by changing to a second electronic form discussed below and shown in FIG. 5.

Returning to query operation 310, where the processor 202 is unable to find the customer number in the master customer database 110, the processor 202 then displays the second electronic form in a display operation 320. The display of the second electronic form may be in a new browser or application window, in a new tab of an open browser, in place of the first electronic form 400 in the current window, or in some other fashion.

In this example, the second electronic form is an add/edit customer (A/E) form 500 as shown in FIG. 5. This A/E form 500 includes various fields that match some of the fields from the GC form 400. These include a primary number field 502, a first name field 504, a last name field 506, and a call back number field 508. The A/E form 500 also includes an OK button 510 that may be selected to accept the information that has been entered for the various fields. When displaying the A/E form 500, the processor 202 may auto-fill the customer primary number that has been previously received into the GC form 400 into the primary customer number field 502.

Upon displaying the A/E form 500, the processor 202 then detects whether the representative has manually entered the first and last names in the appropriate fields 504, 506 at a query operation 322. Where the first and last names have been received, the names are queued either at the server 102 or at the user terminal 106 depending upon the chosen implementation. The processor 202 also detects whether the representative has manually entered the call back number in the appropriate field 508 at a query operation 324. Where the call back number has been received, the call back number is queued either at the server 102 or at the user terminal 106 depending upon the chosen implementation.

Furthermore, upon finding that both of the name fields 504, 506 and the call back number field 508 have been completed, then upon selection of the OK button 510 by the representative, the processor 202 then re-displays the GC form 400 at the display operation 326. In doing so, the GC form 400 is now displayed with both the name fields 404, 406 completed and with the call back number field 408 completed in accordance with the information that was used to complete the name fields 504, 506 and call back number field 508 of the A/E form 500. The processor 202, or the processor 230 of the user terminal 106 depending upon the implementation, extracts the name and call back number information that has been queued and fills in the name and number fields 404, 406, and 408 when re-displaying the GC form 400.

As those name and number fields 404, 406, and 408 are now complete, the processor 202 activates the submit button 414 so that the information of the GC form 400 may be submitted to the tracker database 104. The logical operations proceed as previously described regarding detecting the selection of the submit button 414 and sending the data to the tracker database 104 for further disposition.

As discussed above, information may be provided by a representative to document an interaction with a customer. Multiple electronic forms may be necessary to allow the representative to provide the desired information. Information may be carried over from one form to another, e.g., from the second form back to the first form, so that the representative is not required to manually enter the same information in each of the multiple forms. Accordingly, documenting the interaction with the customer may be more efficient and less likely to have errors resulting from double-entry of information.

While embodiments have been particularly shown and described, it will be understood by those skilled in the art that various other changes in the form and details may be made therein without departing from the spirit and scope of the invention.

What is claimed is:

1. A non-transitory computer readable medium containing instructions that perform acts comprising:
   in relation to a particular service account of a customer, displaying, to a support representative servicing the service account, a first form containing fields for a name of the customer, an identification number of the service account, and a call back telephone number of the customer and containing a submission button that remains inactive until the fields for the name, the identification number, and the call back telephone number are completed;
   receiving data into the field for the identification number of the service account;
   subsequently displaying, to the support representative, a second form containing fields for at least the customer name and the call back telephone number and upon receiving data into the fields of the second form for the customer name and the call back telephone number, then re-displaying the first form including the name and call back number received within the second form and activating the submission button of the first form;
   determining whether the submission button of the first form is selected but not activated;
   if the submission button is selected but not activated, prompting the support representative to enter the call back number; and
   upon activating the submission button of the first form, loading the data from the first form into a tracker database for maintaining the data from the first form for access by other support representatives.

2. The non-transitory computer readable medium of claim 1, wherein the acts further comprise:
   in response to receiving the data into the field for the identification number, looking up the customer name in a customer database;
   if the customer name is found, then auto-filling the name into the field of the name and upon also receiving data into the field for the call back telephone number, then activating the submission button of the first form; and
   if the customer name is not found, then displaying the second form.

3. The non-transitory computer readable medium of claim 1, wherein the service account pertains to telephone service and wherein the identification number of the service account is a telephone number of the telephone service.

4. The non-transitory computer readable medium of claim 1, wherein displaying the first form and displaying the second form comprise sending a first web page representing the first form and sending a second web page representing the second form from a server to a user terminal over a network.

5. The non-transitory computer readable medium of claim 4, wherein receiving data into the first and second forms comprises sending data entered into the first and second forms from the user terminal to the server.

6. The non-transitory computer readable medium of claim 5, wherein the acts further comprise queuing at the server the data received into the second form and wherein re-displaying the first form comprises sending the first web page representing the first form from the server to the user terminal over the network by retrieving the queued data and including the retrieved queued data within the first web page.

7. The non-transitory computer readable medium of claim 4, wherein receiving data into the first and second forms comprises queuing the data at the user terminal.

8. The non-transitory computer readable medium of claim 7, wherein re-displaying the first form comprises retrieving the data queued at the user terminal and including the retrieved queued data within the first web page.

9. A non-transitory computer readable medium containing instructions that perform acts comprising:
   receiving a selection from a support representative servicing a service account for a customer to open a first form regarding handling an incoming request from the customer relating to the service account for the customer;
   in response to the request, displaying, to the support representative, the first form including fields for receiving input to specify an identification of the service account, a name of the customer, and a call back number of the customer and further including a submission button in an inactive state;
   receiving input to specify the identification of the service account;
   looking up the identification in a data store to obtain the name of the customer;
   if the name of the customer is found, then auto-filling the name of the customer into the first form, waiting for input to specify the call back number, and activating the submission button of the first form upon receiving the call back number;
   if the name of the customer is not found, then displaying, to the support representative, a second form that includes fields for receiving the name of the customer and the call back number for the customer, waiting for input to specify the customer name and the call back number, and re-displaying the first form by including the customer name and call back number received within the second form and by activating the submission button of the first form;
   determining whether the submission button of the first form is selected but not activated;
   if the submission button of the first form is selected but not activated, prompting the support representative to enter the call back number; and
   upon activating the submission button of the first form, loading the data from the first form into a tracker database for maintaining the data from the first form for access by other support representatives.

10. The non-transitory computer readable medium of claim 9, wherein the service account pertains to telephone service and wherein the identification of the service account is a telephone number.

11. The non-transitory computer readable medium of claim 9, further comprising:
   receiving input to select the submission button of the first form when the submission button is in the inactive state; and
   displaying the second form in response to receiving the selection of the submission button when the submission button is in the inactive state.

12. The non-transitory computer readable medium of claim 9, wherein the first form and the second form are separate web pages provided from a server to a user terminal, wherein the data that is received into the first and second forms is sent to the server from the user terminal, is queued at the server, and is sent from the server to the tracker database upon selection of the submission button in the activated state.

13. The non-transitory computer readable medium of claim 9, wherein the first form and the second form are separate web pages provided from a server to a user terminal, wherein the data that is received into the first and second forms is queued at the user terminal and is sent from the user terminal to the server upon selection of the submission button in the activated state.

14. A computer-implemented method of collecting information to handle an incoming request from a customer regarding a service account, comprising:
   in relation to a particular service account of a customer, displaying, to a support representative servicing the service account, a first form containing fields for a name of the customer, an identification number of the service account, and a call back telephone number of the customer and containing a submission button that remains inactive until the field for the name, the identification number, and the call back telephone number are completed;
   receiving data into the field for the identification number of the service account; and
   subsequently displaying, to the support representative, a second form containing fields for at least the customer name and the call back telephone number and upon receiving data into the field of the second form for the customer name and the call back telephone number, then re-displaying the first form including the name and call back number received within the second form and activating the submission button of the first form;
   determining whether the submission button of the first form is selected but not activated;
   if the submission button is selected, prompting the support representative to enter the call back number; and
   upon activating the submission button of the first form, loading the data from the first form into a tracker database for maintaining the data from the first form for access by other support representatives.

15. The computer-implemented method of claim 14, further comprising:
   in response to receiving the data into the field for the identification number, looking up the customer name in a customer database;
   if the customer name is found, then auto-filling the name into the field for the name and upon also receiving data into the field for the call back telephone number, then activating the submission button of the first form; and
   if the customer name is not found, then displaying the second form.

16. The computer-implemented method of claim 15, wherein the service account pertains to telephone service and wherein the identification number of the service account is a telephone number of the telephone service.

17. The computer-implemented method of claim 14, wherein displaying the first form and displaying the second form comprise sending a first web page representing the first form and sending a second web page representing the second form from a server to a user terminal over a network.

* * * * *